United States Patent [19]
Kovacevic et al.

[11] Patent Number: 5,481,085
[45] Date of Patent: Jan. 2, 1996

[54] APPARATUS AND METHOD FOR MEASURING 3-D WELD POOL SHAPE

[75] Inventors: Radovan Kovacevic; Yu M. Zhang, both of Lexington, Ky.

[73] Assignee: University of Kentucky Research Foundation, Lexington, Ky.

[21] Appl. No.: 303,980

[22] Filed: Sep. 9, 1994

[51] Int. Cl.$^6$ ................................. B23K 9/095
[52] U.S. Cl. ................ 219/130.01; 219/130.21; 356/376
[58] Field of Search ............... 219/130.01, 130.21, 219/124.34; 356/376; 362/259

[56] References Cited

U.S. PATENT DOCUMENTS

| | | | |
|---|---|---|---|
| 3,407,294 | 10/1968 | Hill | 362/259 |
| 3,976,382 | 8/1976 | Westby | 356/376 |
| 4,417,127 | 11/1983 | Nachev et al. | 219/124.34 |
| 4,491,719 | 1/1985 | Corby, Jr. . | |
| 4,532,408 | 7/1985 | Richardson . | |
| 4,578,561 | 3/1986 | Corby, Jr. et al. . | |
| 4,649,426 | 3/1987 | Bolstad . | |
| 4,767,911 | 8/1988 | Maram et al. . | |
| 4,831,233 | 5/1989 | Gordon | 219/124.34 |
| 4,918,517 | 4/1990 | Burgoon | 358/101 |
| 5,264,678 | 11/1993 | Powell et al. . | |
| 5,275,327 | 1/1994 | Watkins et al. . | |

*Primary Examiner*—Clifford C. Shaw
*Attorney, Agent, or Firm*—King & Schickli

[57] ABSTRACT

A method and apparatus are provided allowing the determination of 3-D weld pool surface geometry in the presence of a welding arc during a welding operation. The method includes the steps of illuminating the weld pool surface with diffused, structured light and detecting specular reflection of that diffused, structured light from the weld pool surface. An acquired image results. By analyzing the acquired image it is possible to determine the geometry of the weld pool surface. The apparatus for performing the method includes a high intensity light source, a diffuser and a structured light forming grid. A camera is provided for specular reflection detection of the light reflecting from the weld pool surface.

15 Claims, 1 Drawing Sheet

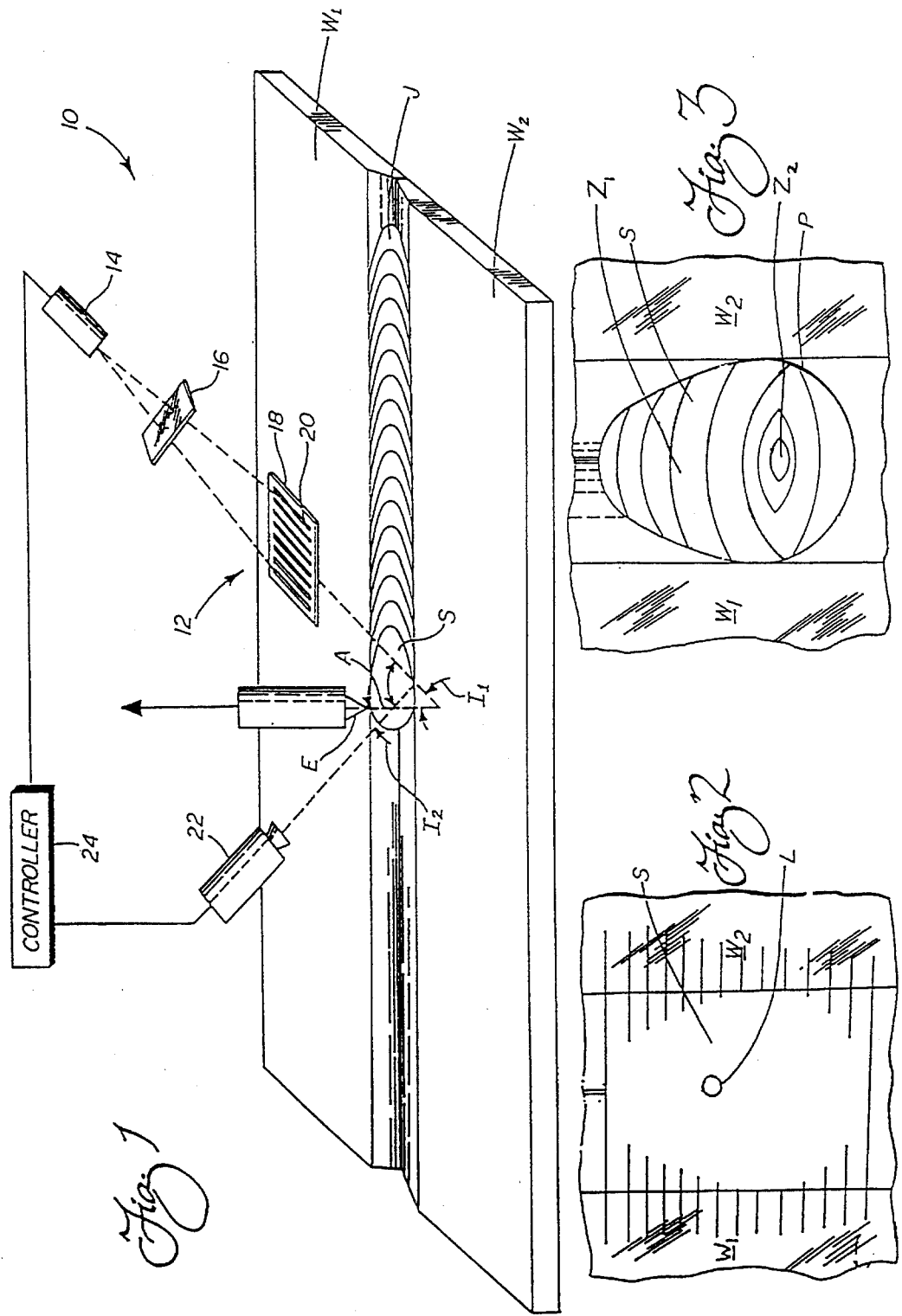

APPARATUS AND METHOD FOR MEASURING 3-D WELD POOL SHAPE

TECHNICAL FIELD

The present invention relates generally to the welding field and, more particularly, to a method and apparatus for determining three-dimensional (3-D) weld pool surface geometry in the presence of a welding arc during a welding operation.

BACKGROUND OF THE INVENTION

Significant advances have been made in recent years in the development of automated, high-precision welding equipment. In order to consistently achieve high quality welded joints, such automated welding equipment must include an accurate seam tracking system and a precise weld penetration monitoring and control system. In its most preferred form, this monitoring and control system would take the form of a closed-loop control incorporating not only means for measuring the penetration state but also a feedback control strategy for regulation of the welding operation.

The importance of providing an accurate and effective weld penetration monitor and control system is borne out in recent studies. Specifically, it has been shown that weld pool surface depression has a major effect on weld penetration. More specifically, the distribution of the welding arc current density, which is a primary welding parameter, is significantly affected by the shape of the depressed pool surface. Further, it should be appreciated that the plasma column shape and the current distribution affect the geometry of the pool surface. Thus, the arc plasma-weld pool interaction has nonlinear boundary conditions. In fact, virtually all other physical quantities associated with the welding arc and the molten pool are affected by the current density distribution. Obviously, convection in the pool is also influenced by the shape of the welding pool surface.

It follows, therefore, that taking quantitative measurements of the weld pool surface is fundamental to any precision arc welding process. The welding environment, however, creates significant difficulties in making such measurements and, in the past, these difficulties have stymied those skilled in the art seeking to develop an effective and proper method to monitor the depressed pool surface in the presence of the weld arc during a welding operation. As a result of these difficulties, most quantitative experimental studies of the arc plasma pool interaction have been restricted to or assumed a flat pool surface.

Generally speaking, however, a weld pool surface is not actually flat. Pool surface deformation can always be observed in gas metal arc welding (GMAW) and in gas tungsten arc welding (GTAW) with filler due to the mass transfer. For GTAW without filler, pool surface deformation is apparent in the full penetration mode. Thus, pool surface deformation is an inherent characteristic of the arc welding processes and those quantitative experimental studies based upon a flat pool surface are only of limited value.

Despite the clear importance of providing 3-D pool surface shape measurement, only limited work has been done to date that actually is directed to accomplishing this goal. This is primarily due to the high heat and light intensity of the welding arc which significantly limits the possibility for taking effective measurements. Some work has, however, been conducted at Ohio State University by Rokhlin and Guu using radiography. The received x-ray radiation increases with the depression depth. By this approach, many valuable results have been acquired based on pool surface measurement. However, only stationary arc welding was addressed due to equipment limitations. Further, in order to avoid the influence of electrode and gas nozzle, a long electrode extension and an inclined torch attitude were used. The imaging device and x-ray source could not both be attached to the torch to form a "top-side" sensor. This, in addition to the radioactivity, adversely influences the practical application of this technology and approach for monitoring or control of commercial welding operations. Further, if full penetration is addressed where the back-side pool surface deformation occurs, pool surface shape is likely to be difficult to extract. Also, since the depression information is described by grayness level which determines the material thickness, the identification of depression from the grayness contrast of the x-ray image by a human is not straightforward and therefore readily achieved. These additional shortcomings effectively remove this approach from any serious consideration as a practical method for measuring weld pool deformation.

The desire to glean information relative to the geometry of a weld pool in 3-D, is also acknowledged in U.S. Pat. No. 4,491,719 to Corby, Jr. In this patent, a projector system generates a programmable 3-D light pattern that is projected across the weld pool surface. A camera is then used to detect the reflection of the programmable pattern from the weld pool surface.

The approach disclosed in the Corby, Jr. et al. patent has a number of drawbacks that prevent it from being effectively utilized and practically applied in commercial welding operations. More specifically, the weld pool surface is mirror-like and incident light is almost entirely reflected. In the Corby, Jr. et al. patent, the programmable laser light pattern is projected by optical fibers and travels to the weld pool surface without a significant incident angle. As a result, it is not possible to detect or collect the specular reflection of the reflected laser light pattern and, therefore, only diffuse reflection is viewed. Of course, as the weld pool surface is mirror-like, very little incident light will be diffusely reflected. Consequently, a programmable laser light pattern can only be acquired from the weld pool surface where a very powerful laser is utilized. This is not possible in practical application due to both safety considerations and capital expense of equipment and cost of operation.

SUMMARY OF THE INVENTION

Accordingly, it is a primary object of the present invention to provide a method and apparatus for determining weld pool surface geometry in 3-D in the presence of a welding arc during a welding operation that overcomes the above described limitations and disadvantages of the prior art.

Another object of the present invention is to provide a practical method and apparatus for determining 3-D weld pool surface geometry capable of practical application within a commercial setting.

Still another object of the present invention is to provide a method and apparatus for determining weld surface geometry in the presence of a welding arc during a welding operation that may be utilized in a closed-loop control system to effectively allow superior quality, high-precision automated welding operations to be performed in a simple and efficient manner. Advantageously, the method and apparatus allow the monitoring and control of weld quality in a real-time, cost effective, practical and reliable manner.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved method is provided for determining weld pool surface geometry in 3-D. Advantageously, the method allows practical application since it may be performed in the presence of a welding arc during a welding operation.

The method includes a step of illuminating the weld pool surface with diffused, structured light. Next is the detecting of the full spectral reflection of the diffused, structured light from the weld pool surface so as to produce an acquired image. This is then followed by the analyzing of the acquired image to determine the geometry of the weld pool surface. Utilizing this approach it is possible to determine the length, width, depth, sag or depression and actual overall outline of the weld pool. Advantageously, this information may be utilized in improving the accuracy, precision and quality of the automated welding process. Further, the information may be incorporated into a closed-loop control system whereby a feedback control strategy may be adopted for ongoing regulation of the automated welding process to provide significantly enhanced overall weld quality.

More specifically, the method includes the projecting of the light from the light source (e.g. a laser) through frosted glass in order to provide diffusion to the light. The diffused light is also projected through a grid to provide structuring. Still more specifically, the grid is preferably constructed from an opaque material and includes a series of slits between substantially 10–50 mm in length, 0.1–0.5 mm in width that are spaced 0.5–2.0 mm apart.

In accordance with yet another aspect of present invention there is the step of directing the diffused, structured light at an incident angle of substantially 30°–60° and, more preferably, substantially 45° relative to the welding arc during the illuminating step. Preferably, the detecting is conducted at an incident angle of substantially 30°–60° and, more preferably, substantially 45° relative to the welding arc and substantially 60°–120° and, more preferably, substantially 90° relative to the direction of illumination. This geometrical arrangement insures that the full spectral reflectance of the light is detected while minimizing the influence of the welding arc.

Of course, the influence of the welding arc may be further minimized by utilizing a high-intensity laser light source. Preferably, the laser light source has an intensity greater than that of the welding arc. In addition, by pulsing the high intensity laser light source in accordance with a predetermined pattern and/or frequency and synchronizing full reflection detecting to correspond with that predetermine pattern and/or frequency, the influence of the welding arc may be further minimized and actually, effectively eliminated.

More specifically, it is preferred that the laser light be pulsated at a frequency between 1–30 Hz with an average power of approximately 7 mW and a peak power of approximately 50 kW. The discharge time of the laser should be less than 5 ns. Preferably, the laser light source produces light in the near-ultraviolet portion of the optical spectrum at a wavelength of about 337 nm. At that wavelength, interference from the weld arc and background sources is effectively minimized.

The apparatus of the present invention includes a means for illuminating the weld pool surface with the diffused, structured light, a means for detecting the full spectral reflection of the diffused, structured light from the weld pool surface so as to produce an acquired image and means for analyzing the acquired image to determine the geometry of the weld pool surface.

It should be appreciated that the structuring of the light by projection through the grid is of critical importance in allowing the present method and apparatus to be utilized to determine the depression and convexity of the weld pool surface. More specifically, such projection creates a striped illumination pattern on the weld pool surface.

It should further be appreciated that the diffusing of the illuminating light by projection through the frosted glass functions in combination with detection of the full spectral reflectance to allow the reflected pattern of stripes to be fully detected. Further, this is possible even when utilizing a laser of relatively low power or intensity thereby meeting practical commercialization requirements.

Of course, the molten weld pool provides a mirror-like reflection that is distinguishable from the solid portion of the work pieces that are being welded together. Accordingly, the length, width and general outline of the weld pool is readily discernable. Further, any depression and convexity of the weld pool surface is also readily indicated. More specifically, a truly flat surface reflects the structured pattern of the light in the same manner that the illumination is received: that is, as equally spaced parallel lines or stripes of light. The greater the depression or convexity present, however, the greater the deformation or curvature presented in the reflected lines of light. Thus, it is possible to readily determine the extent of the depression or bulge of the weld pool surface as well and this information may be readily related to the depth of weld penetration.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing:

FIG. 1 is a schematical perspective view showing the apparatus of the present invention;

FIG. 2 is schematical representation of the weld pool image produced by the prior art method disclosed in U.S. Pat. No. 4,491,719 to Corby, Jr. when viewing a specular weld pool surface; and FIG. 3 is a schematical representation of the acquired image produced when viewing a specular weld pool surface in accordance with the present method.

DETAILED DESCRIPTION OF THE INVENTION

Reference is now made to FIG. 1 schematically illustrating the apparatus 10 of the present invention for determining 3-D weld pool surface geometry. Advantageously the apparatus 10 is capable of making this determination in the presence of a welding arc during a welding operation and, therefore, it is practical for utilization in a number of industrial applications. The apparatus is being shown in FIG. 1 with respect to the butt welding together of two work pieces $W_1$ and $W_2$ by means of the weld joint J. It should be appreciated, however, that this particular application is only presented for purposes of illustration and it is not to be considered as limiting.

As shown, the apparatus 10 includes a means, generally designated by reference numeral 12, for illuminating the surface S of the weld pool with diffused, 3-D structured light. More specifically, the illuminating means 12 includes a high intensity laser light source 14 (e.g. ultraviolet laser with the peak power up to 50 kW). Preferably, the laser light source provides a light having an intensity greater than that of the welding arc A produced by the electrode E during the welding operation. Thus, it should be appreciated that the laser light source may have a peak power of at least approximately 50 kW.

The laser light generated by the laser light source 14 is directed through a diffuser 16 so as to provide a scattered incident light. Preferably, the diffuser 16 is a pane of frosted glass. Such a frosted glass diffuser 16 may be prepared by exposing a pane of glass to a high-pressure abrasive water jet for two seconds. Garnet of 200 micrometers in average diameter is utilized as an abrasive material to generate dimples on one side of the glass.

The resulting rough surface of the glass diffuser 16 functions to diffuse or scatter the light which is then projected through a grid 18 that provides 3-D structuring to the diffused light (e.g. a striped illumination pattern). More specifically, grid 18 may be formed from any appropriate opaque material. The grid 18 includes a series of slits 20 that are, for example, between substantially 10–50 mm in length, 0.1–0.5 mm in width and spaced between substantially 0.5–2.0 mm apart.

By projecting the laser light from the laser light source 14 through the diffuser 16 and grid 18 it is possible to illuminate the weld pool surface S with diffused, structured laser light: that is, a series of spaced apart, diffused laser light lines or stripes. This projected striped-line image of diffused light is directed upon the surface S of the entire weld pool at an incident angle $I_1$ of substantially 30°–60° and, more preferably, substantially 45° relative to the welding arc A.

The apparatus 10 also includes a detecting means 22 preferably in a form of a high speed shutter camera. Such a camera 22 is specifically adapted for detecting the spectral reflection of the diffused, structured light from the weld pool surface S so as to produce an acquired image. As best shown in FIG. 1, the detecting is conducted at an incident angle $I_2$ of substantially 30°–60° and, more preferably, substantially 45° relative to the welding arc A and substantially 60°–120° and, more preferably, substantially 90° relative to the direction of illumination $(I_1+I_2)$. This spacial orientation of the directions of illumination and detection relative to the welding arc A serves to allow detection of the full spectral reflection coming from the weld pool surface S while minimizing the interference that might otherwise be produced by the high intensity light of the arc during the welding operation. Further, this orientation aids in the practical application of the present invention to commercial welding operations as it allows the apparatus 10 to be sufficiently spaced from the welding electrode E to maintain the necessary clearance to allow work piece manipulation near the electrode.

With the reference to FIGS. 2 and 3, respectively, a comparison of the results achieved in viewing a specular weld pool surface S utilizing the method disclosed in U.S. Pat. No. 4,491,719 to Corby, Jr. with that of the present invention will now be made.

In the prior art, Corby, Jr. approach laser light is projected through a patterned mask then focused through a lens for transmission through an optic bundle and ultimate projection over the weld pool surface. As the weld pool surface is mirror-like, the structured light is not diffusely reflected and only specular reflection occurs. Thus, the observed scene is the virtual image of the original object. Thus, as should be appreciated from reviewing FIG. 2, the light pattern is only visible as striped lines on the solidified portion of the work pieces $W_1$, $W_2$ and is completely invisible on the molten weld pool surface S. In fact, only a light spot L of high intensity appears in the weld pool surface S and it is not possible to obtain any indication of the three dimensional geometry of the surface and particularly the concavity or convexity thereof. Hence, little useful information is gleaned from this prior art approach.

In contrast, as shown in FIG. 3, the present invention utilizes a novel incident mechanism of structured light to acquire three dimensional molten pool shape information. A frosted glass 16 is placed between the laser light source 14 and the grid 18. The function of the frosted glass 16 is to disperse the incident laser light with a small diffuse angle. In this case, the virtual image of the light pattern, specularly reflected from the weld pool surface, is a map of deformed stripes (note FIG. 3). The acquired image contains only a specularly reflected light pattern from the molten pool surface S. That light pattern is not evident in the reflection from the solid surfaces of the work pieces $W_1$, $W_2$ surrounding the molten pool due to its low intensity. Accordingly, the molten pool surface S is clearly outlined as shown at P.

Further, it should be appreciated that the deformation of the lines of the acquired image reflect the shape of the molten pool (i.e. the greater the curvature of the lines, the greater the convexity or concavity of the weld pool surface). Specifically, it is evident from FIG. 3 that the molten pool consists of convex and concave zones $Z_1$, $Z_2$. Concave zone $Z_2$ is the depression of the molten pool surface S under the arc and the shape and dimension of this zone are used to determine the penetration of the weld. Conversely, the shape and dimension of the convex zone $Z_1$ are used to evaluate the quality of the solidified bead. In general, the shape and dimensions of the molten pool surface are a direct source of information that is used for controlling the welding process.

Where it is desired to increase the signal of the acquired image, the apparatus 10 may incorporate a controller 24 in the form of a microprocessor. Such a controller 24 may be utilized to increase the signal by pulsating the laser light source 14 in a predetermined pattern and/or at a predetermined frequency (e.g. between substantially 1–30 Hz). The resulting pulsating light illuminating the weld pool surface S is reflected spectrally toward the camera 22. The controller 24 also serves to synchronize the operation of the high speed shutter camera 22 to correspond to the pulse pattern and/or frequency of the laser light. Advantageously, the pulsing allows a higher intensity light to be utilized at peak power while minimizing the overall average energy requirements in its production. Such a high intensity pulse floods the field and effectively overcomes the intensity of that light produced by the welding arc thereby increasing the signal image of the detector.

Finally, the controller 24 may also be utilized to analyze the acquired image by relating the extent of curvature or deformation of the striped lines of the acquired image to the convexity or concavity of the weld pool surface and, therefore, to weld penetration.

In summary, numerous benefits result from employing the concepts of the present invention. Due to the utilization of diffused illumination, the reflected rays of light from the mirror-like weld pool surface are always capable of collection by means of the camera 22. Thus, it is possible to acquire a 3-D image of the molten pool under substantially any operating conditions. Further, since diffused light is utilized during illumination of the weld pool surface and the full reflectance is detected, it should be appreciated that a relatively lower intensity laser light source may be utilized to provide an acceptable acquired image than is possible with any such prior art approach to this problem. Hence, an economically practical apparatus and method for determining weld pool surface geometry in the presence of a welding arc during a welding operation is now provided for the first time.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with breadth to which they are fairly, legally and equitably entitled.

We claim:

1. A method for determining 3-D weld pool surface geometry in the presence of a welding arc during a welding operation, comprising the steps of:

illuminating the weld pool surface with diffused, structured light directed at an incident angle of substantially 45° relative to the welding arc;

detecting specular reflection of the diffused, structured light from the weld pool surface at an incident angle of substantially 45° relative to the welding arc and substantially 90° relative to the direction of illumination so as to produce an acquired image; and analyzing the acquired image to determine the geometry of the weld pool surface.

2. The method set forth in claim 1, including projecting light through frosted glass to provide diffusion to the light.

3. The method set forth in claim 1, including projecting light through a grid to provide structuring to the light.

4. The method set forth in claim 1, including projecting light through (a) a frosted glass to provide diffusion and (b) a grid to provide structuring to the lighting.

5. The method set forth in claim 4, including utilizing a high-intensity laser light source for illuminating the weld pool surface.

6. The method set forth in claim 5, including pulsing the high intensity laser light source in a predetermined pattern and synchronizing specular reflection detecting to correspond with that predetermined pattern.

7. The method set forth in claim 1, including utilizing a high-intensity laser light source for illuminating the weld pool surface.

8. The method set forth in claim 7, including pulsing the high intensity laser light source in predetermined pattern and synchronizing specular reflection detecting to correspond with that predetermined pattern.

9. An apparatus for determining weld pool surface geometry in the presence of a welding arc during a welding operation, comprising:

means for illuminating the weld pool surface with diffused, structured light, said illuminating means including a high intensity laser light source, means for diffusing laser light generated by said laser light source and means for structuring light generated by said laser light source;

means for detecting specular reflection of the diffused, structured light reflected from the weld pool surface so as to produce an acquired image; and means for analyzing the acquired image to determine the geometry of the weld pool surface.

10. The apparatus set forth in claim 9, wherein said diffusing means is frosted glass through which the laser light is projected.

11. The apparatus set forth in claim 9, wherein said structuring means is an opaque grid including a series of slits between substantially 10–50 mm in length and between substantially 0.1–0.5 mm in width spaced between substantially 0.5–2.0 mm apart.

12. The apparatus set forth in claim 9, including means for pulsating said laser light source in a predetermined pattern so as to have an average intensity of substantially 7 mW and a peak intensity of substantially 50 kW.

13. The apparatus set forth in claim 12, wherein the light generated by said laser light source has a wavelength of substantially 337 nm.

14. The apparatus set forth in claim 9, further including control means for (a) pulsating the diffused, structured light illuminating the weld pool surface at a predetermined frequency of between substantially 1–30 Hz and (b) synchronizing operation of said detecting means to the predetermined frequency of the pulsing.

15. The apparatus set forth in claim 9, wherein said detecting means is a high-shutter speed camera.

\* \* \* \* \*